United States Patent [19]

Nilsson

[11] 3,968,038
[45] July 6, 1976

[54] APPARATUS FOR TREATING LIQUIDS

[75] Inventor: Bengt H. Nilsson, Skoghall, Sweden

[73] Assignee: Uddeholms Aktiebolag, Sweden

[22] Filed: July 10, 1975

[21] Appl. No.: 594,641

[30] Foreign Application Priority Data
July 10, 1974 Sweden .............................. 7409056

[52] U.S. Cl. ................................ 210/275; 210/293
[51] Int. Cl.² ........................................ B01D 29/38
[58] Field of Search ........... 210/264, 265, 289, 291, 210/293, 263, 275

[56] References Cited
UNITED STATES PATENTS

| | | | |
|---|---|---|---|
| 2,176,549 | 10/1939 | Smith .............................. | 210/289 X |
| 2,749,290 | 6/1956 | Penick et al. .................... | 210/293 X |
| 2,772,780 | 12/1956 | Penick et al. .................... | 210/293 X |
| 2,809,158 | 10/1957 | Yustick ............................ | 210/289 X |
| 3,011,643 | 12/1961 | McCoy ............................ | 210/264 X |
| 3,178,024 | 4/1965 | Jacuzzi ............................ | 210/264 X |

*Primary Examiner*—Charles N. Hart
*Assistant Examiner*—Ethel R. Cross
*Attorney, Agent, or Firm*—Cushman, Darby & Cushman

[57] ABSTRACT

A tank containing a bed of particulate material, e.g. a sand filter bed or an ion exchange bed, has a bed-supporting bottom structure formed by upper and lower bottom plates rigidly connected with each other through a plurality of vertical sleeves opening into the spaces above and below the tank bottom structure. Openings in the wall of each sleeve connect the interior of the sleeve with the compartment formed between the bottom plates. A strainer unit is removably inserted in each sleeve through the lower end of the sleeve and passes liquid between the bed and the compartment between the bottom plates by way of the openings in the side wall of the sleeve. An adjustable valve member accessible from below the tank bottom structure serves to control the flow of liquid through the strainer unit.

7 Claims, 5 Drawing Figures

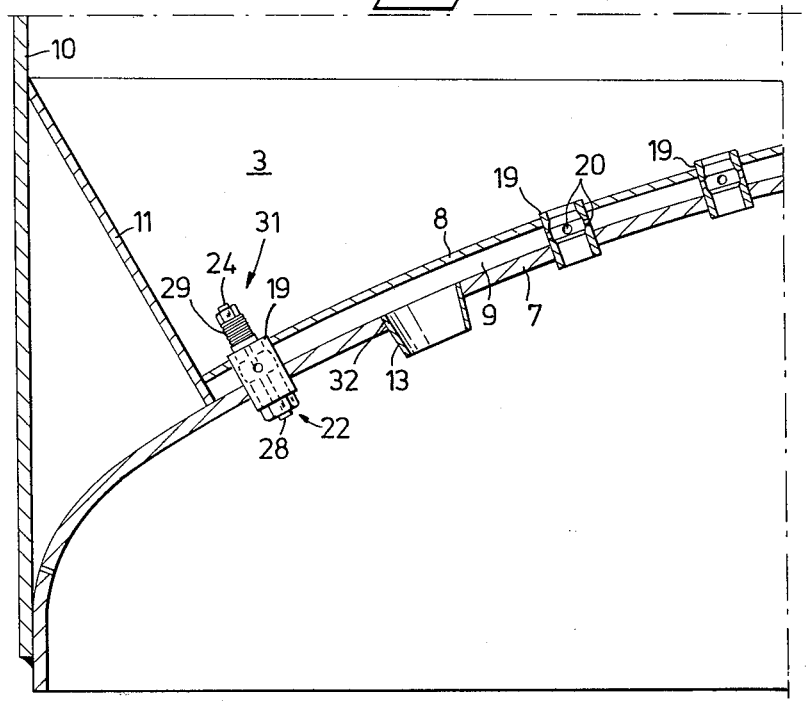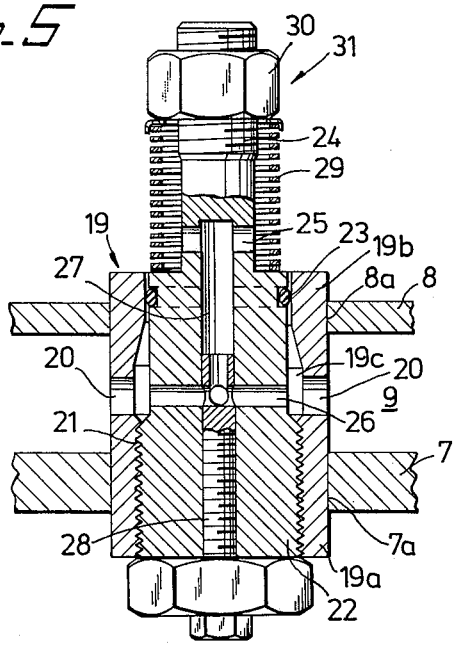

APPARATUS FOR TREATING LIQUIDS

This invention relates to apparatus for treating liquids, and more particularly to apparatus of the type in which the liquid to be treated percolates through a bed of particulate material which is accomodated in a tank and supported by a tank bottom structure through which the treated liquid is withdrawn. The bed may be formed by one or more layers of powder, granules, sand and/or fine-grained material.

The apparatus according to the invention has been developed primarily for use in connection with purifying waste-water from woodpulp and paper mills according to a method comprising passing the waste water through a bed of granular resin material which captures organic substances carried in the water. While the invention will be described with particular reference to this application, it is to be understood that other applications are possible, e.g. in sand filters.

Purification of waste-water by passing the water downwardly through a particulate bed in a column or other tank is usually carried out cyclically, with purification phases alternating with phases in which the bed is backwashed so as to be regenerated or cleansed from the captured impurities. On changing over to the purification phase from the backwash phase a "tail effect" occurs, resulting in pollution of the purified water by impurities from the preceding backwash phase remaining in a liquid collecting and distributing compartment in the tank bottom structure. Similarly, during the backwash phase, the purified water remaining in this compartment is carried away with the impurities, thus diluting them. This lag or slow response of the apparatus and the resulting "tail effect" are proportional to the volume of the tank bottom compartment. It is therefore an object of the present invention to reduce the tail effect by providing a tank bottom structure in which the compartment serving to collect and/or distribute the liquid flowing through the bed — for convenience this compartment is hereinafter referred to as bottom compartment — has a small volume.

It is also an object of the invention to provide a tank bottom structure which is advantageous in respect of strength and material economy so that it can be made entirely from acid-resistant stainless steel and still be economically acceptable.

In view of the foregoing objects, the present invention provides a liquid treating apparatus comprising a tank the bottom structure of which comprises upper and lower bottom plates which are perforated and define between them the bottom compartment, which communicates with the bed through openings in the upper bottom plate and with liquid withdrawal or supply pipes through openings in the lower bottom plate. The openings in the upper bottom plate are aligned with the openings in the lower bottom plate. A plurality of sleeves extend between the two bottom plates in alignment with the openings and are rigidly attached to the plates, e.g. welded thereto. The interior of each sleeve communicates with the bed and with the bottom compartment to pass liquid from the bed to the bottom compartment or vice versa.

Since the sleeves are rigidly attached to the two spaced bottom plates, the tank bottom structure of the apparatus according to the inventin has excellent strength, even if the bottom plates are relatively thin and relatively close to each other. The volume of the bottom ccompartment formed between the bottom plates can therefore be substantially reduced without consequent reduction of the capability of the bottom structure to supprot heavy beds and without increasing the thickenss of the bottom plates. The distance between the bottom plates is always such that the ratio of the volume of the bottom compartment to the volume occupied by the bed does not exceed 1:10 and preferably does not exceed 1:30. While basically the ratio should be as small as possible and there is no critical lower limit, the distance between the bottom plates should not be reduced to an extent resulting in an undue pressure loss of the flow of liquid passing through the bottom compartment. The distance must also be large enough to permit uniform draining of the bed and uniform distribution of the backwash liquid to the bed. In some cases, however, a ratio in the range between 1:50 and 1:200 may be advantageous.

In the preferred construction the two bottom plates are substantially parallel so that the distance between them is substantially constant. All sleeves can then be identical in respect of shape and dimensions.

Additional objects, features and advantages will appear from the following description of a specific embodiment shown on the accompanying drawings.

FIG. 4 is a fragmentary sectional view of a portion of the structure in FIG. 1 on an enlarged scale, some elements being omitted for illustrative purposes;

FIG. 5 is a vertical sectional view on a still larger scale showing a portion of the tank bottom with a sleeve secured thereto and a strainer unit screwed into the sleeve.

Figure 1:
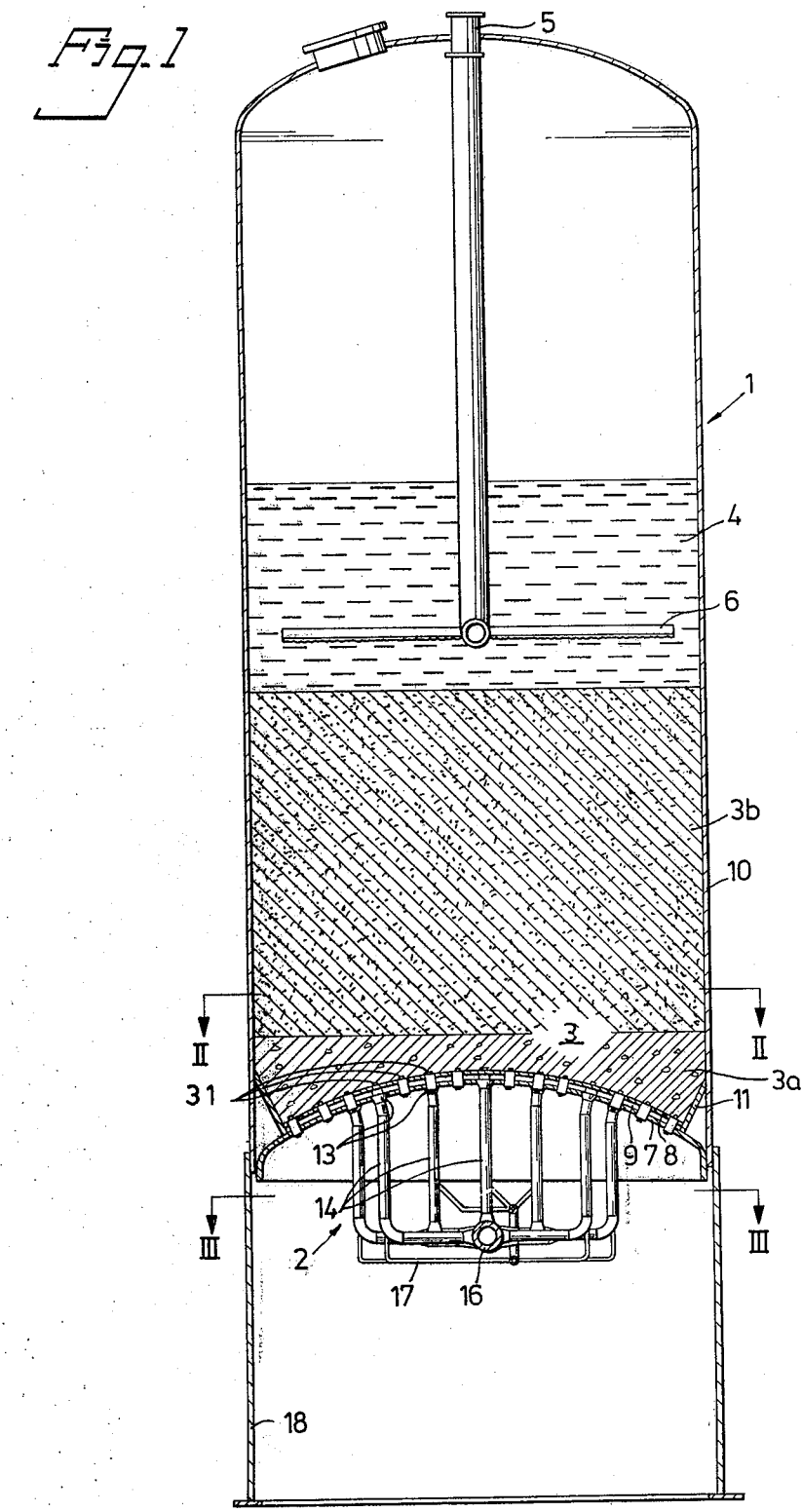
FIG. 1 is a vertical sectional view of a liquid treating apparatus embodying the present invention.

On the drawings, FIG. 1 shows a waste-water treating apparatus comprising a pressure-tight cylindrical tank 1. This tank has a bottom structure 2 supporting a bed 3 accommodated in the tank. The bed 3 is formed by a sand filter layer 3a and a superimposed layer 3b of substantially greater depth consisting of a granular ion exchange or adsorbent resin or a mixture of different resins. Waste water 4 to be treated is fed into the upper portion of the tank through a feed pipe 5 and a distributor 6. The tank also includes means (not shown) for removing washed-off impurities.

The tank bottom structure 2, which is circular in plan view, comprises two dished or dome shaped steel plates 7 and 8 having their convex sides facing the chamber above the bottom structure in which the bed 3 is accommodated. The two bottom plates 7 and 8 are uniformly spaced from each other, and the distance between them is relatively small so that the volume of the bottom compartment 9 formed between the plates is small in relation to the volume of the bed 3. For example, in one actual embodiment of the tank shown in FIG. 1, the bottom compartment 9 has a height of 3 cm while the average depth of the bed is 300 cm. Thus, in this embodiment the ratio of the volume of the bottom compartments 9 to the volume occupied by the bed 3 is only about 1:100.

The lower portion of the cylindrical wall 10 of the tank 1 is welded directly to the lower bottom plate 7 and also connected to both bottom plates 7 and 8 through a welded conical sheet metal collar 11 which forms a circumferential wall for the bottom compartment 9. A cylindrical base 18 supports the entire tank 1.

The lower bottom plate 7 has a multiplicity of substantially uniformly distributed circular openings 7a, and the upper bottom plate 8 has similar openings 8a, each such opening 8a being axially aligned with an opening 7a. Through each pair of aligned openings 7a and 8a extends a cylindrical steel sleeve 19, formed by a short length of tubing. The sleeve 19 has its opposite end portions 19a and 19b welded to the two bottom plates 7 and 8 in a fluid-tight manner around the perimeter of the openings 7a and 8a, see FIGS. 4 and 5. The two spaced bottom plates 7 and 8 and the welded sleeves 19 thus form a framework construction characterized by high load-carrying capacity.

Each sleeve 19 has four lateral openings 20 providing constant open communication between the interior of the sleeve and the bottom compartment 9. Liquid can thus flow between the bed accommodating space above the upper bottom plate 8 and the bottom compartment 9 through these openings 20.

The upper end portion 19b of the sleeves 19 has a smaller inner diameter than the lower end portion 19a which is internally threaded as shown at 21 in FIG. 5. The interior surface of the sleeves forms an annular recess 19c in the region of the four openings 20.

A strainer body 22, the lower portion of which is externally threaded, is screwed into each sleeve 19 from below. The upper end portion of the strainer body 22 is provided with an O-ring seal 23 sealingly engaging the inner surface of the upper end portion 19b of the sleeve. A neck 24 of the strainer body 22 projects upwardly beyond the upper end of the sleeve and is provided with external threads.

A transverse through passage 25 is formed in the neck 24, and two additional intersecting transverse through passages 26 are formed in the strainer body in the region of the annular recess 19c. An axial passage 27 extends between the transverse passage 25 and the two transverse passages 26. A threaded valve member 28, screwed into the internally threaded lower portion of the axial passage 27, serves to control the flow of liquid through the passage 27 between the passages 25 and 26.

A strainer element 29, formed by a helically wound strip, is disposed around the neck 24 of the strainer body 22 and is held in position by a nut 30. The maximum transverse dimension of the strainer element 29 and of the nut 30 is less than smallest inner diameter of the sleeve 19. The strainer body 22 and the strainer element 29 form a strainer unit generally designated 31 through which liquid can flow both downwardly from the bed 3 to the bottom compartment 9 and upwardly from the bottom compartment 9 to the bed, the flow being controllable by means of the valve member 28. As best shown in FIG. 5, the strainer unit 31 can be screwed into and out of the sleeve without there being any need for access to the bed-accommodating space above the tank bottom structure 2. Thus, adjustment, maintenance and replacement of all strainer units can be carried out from the easily accessible space below the tank bottom structure 2, even while the apparatus is in operation.

Since the strainer units 31 are always easily accessible and replaceable it is possible to ensure that all or almost all strainer units function properly at any given time. Thus, there is no need to provide the strainer units in a number that is much in excess of the number of properly functioning units required to ensure that the bed will pass the anticipated flow of liquid and that this flow is distributed over the cross-section of the bed with sufficient uniformity.

Figure 2:
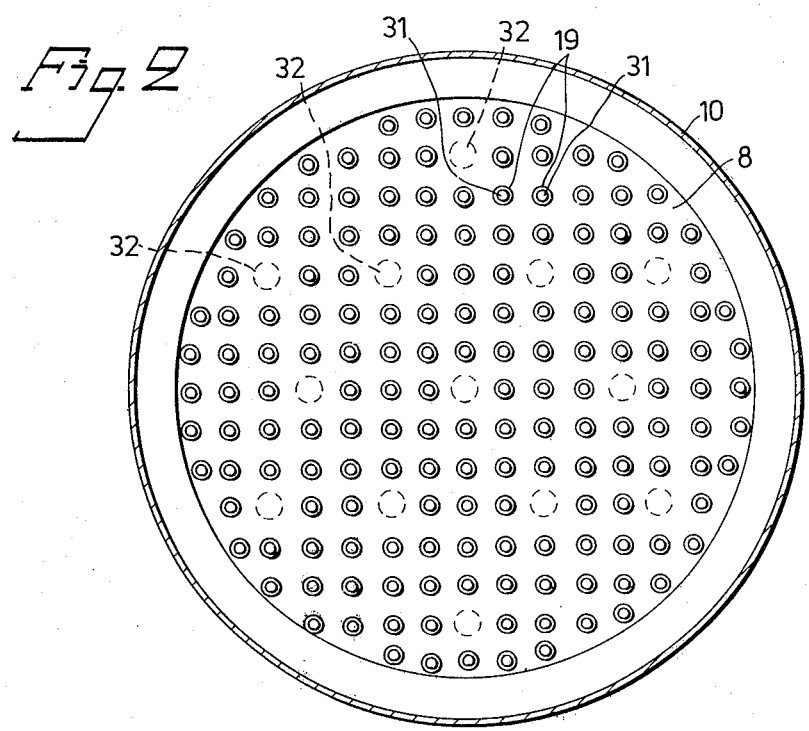
FIG. 2 is a horizontal sectional view on line II—II of FIG. 1.
Figure 3:
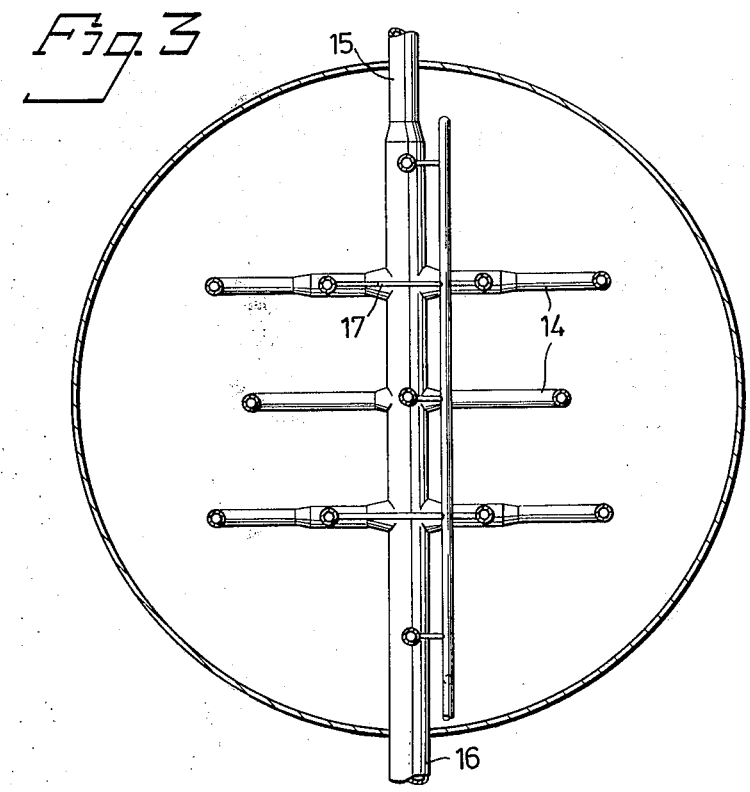
FIG. 3 is a horizontal sectional veiw of line III—III of FIG. 1.

For draining the treated liquid collected in the bottom compartment 9 as well as for supplying backwash liquid to the bottom compartment 9, the lower bottom plate 7 has a number of additional circular openings 32. In the embodiment shown in the drawings there are thirteen openings 32 which are located so as to ensure a substantially uniform flow of liquid in the bottom compartment 9, see FIG. 2. A tubular collar 13 is attached to each opening by being welded to the lower bottom plate 7, and each such collar communicates with a common drain conduit 15 and a common backwash conduit 16 through a tube 14. Air conduits 17 are connected to the tubes 14 to permit blow-through of the bed with compressed air during the cleansing operation.

An important feature of the apparatus illustrated in the drawings is the upwardly dished shape of the tank bottom structure. This shape not only improves the capability of the tank bottom to withstand the weight of the bed and the pressure of the liquid, but also contributes to uniform distribution of the liquid flow through the bed. Especially in deep beds, the so-called wall effects often present problems, e.g. by causing a greater rate of flow in the peripheral regions of the bed than in the central regions so that the retention time of the water in the bed is different for different regions of the bed. This makes it difficult to optimize the treatment of the water. Moreover, during the backwash phase bed material may migrate between the central and peripheral bed portions, resulting in a concentration of larger particles in the vicinity of the tank wall. The dished shape of the bottom plates alleviates these problems by reducing the height of the central region of the column, so that the liquid flow in the central region of the cross-section of the bed is promoted.

In operation of the apparatus, the water to be treated enters the tank 1 through the feed pipe 5 and the distributor 6. It percolates through the bed 3 and is collected in the bottom compartment 9 through the strainer units 31 and is then discharged through the tubes 14 and the drain tube 15. Backwash fluid (liquid and air) is fed to the bottom compartment through the backwash conduit 16 and the air conduits 17 and enters the bottom compartment 9 from which it is distributed over the cross-section of the bed by the strainer units 31, which thus serve as nozzle units during the backwash phases.

As is apparent from the foregoing description, the invention is not restricted to any particular type or shape of the tank provided with the bottom structure according to the invention. Thus, the term "tank" as used in this specification is to be understood as including not only the relatively high and narrow tank (column) shown in FIG. 1, but also many other types of vessels or containers suitable for containing a bed of particulate material.

What is claimed is:

1. Apparatus for treating a liquid by causing it to flow downwardly through a bed of particulate material, comprising a tank forming a bed-accommodating chamber therein and having a bed-supporting bottom structure, said bottom structure comprising upper and lower bottom plates having a plurality of opposing openings therein and forming between them a bottom compartment, conduit means communicating with the bottom compartment through the lower bottom plate, and a plurality of sleeves extending between the upper and lower bottom plates in alignment with pairs of opposing openings therein, the lower ends of said sleeves adapted to be closed in operation; axially spaced portions of each sleeve being rigidly joined with respectively the upper and the lower bottom plate, the interior of each sleeve communicating with the bed-accommodating chamber and with the bottom compartment.

2. Apparatus according to claim 1 in which the sleeves extend through the pairs of openings and are welded to the bottom plates.

3. Apparatus according to claim 1 in which the distance between the bottom plates is substantially constant throughout the bottom compartment.

4. Apparatus according to claim 3 in which the bottom plates are dished with the convex sides facing the bed-accommodating chamber.

5. Apparatus according to claim 1 in which a strainer unit is inserted in the interior of each sleeve.

6. Apparatus according to claim 5 in which the strainer unit is screwed into the sleeve from the lower end thereof.

7. Apparatus according to claim 1 in which the bottom compartment communicates with said conduit means through a plurality of openings in the lower bottom plate, which openings are substantially uniformly distributed over the lower bottom plate.

* * * * *